United States Patent
Liu et al.

(10) Patent No.: US 12,482,309 B2
(45) Date of Patent: Nov. 25, 2025

(54) AUTOMATIC READING AND WRITING METHOD OF VEHICULAR CALIBRATION SIGNAL AND VEHICLE CALIBRATION METHOD

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

( * ) Notice: Subject to any disclaimer, the term of this patent is extended or adjusted under 35 U.S.C. 154(b) by 213 days.

(21) Appl. No.: 18/234,413

(22) Filed: Aug. 16, 2023

(65) Prior Publication Data

US 2025/0061753 A1 Feb. 20, 2025

(51) Int. Cl.
*G07C 5/08* (2006.01)
(52) U.S. Cl.
CPC .................. *G07C 5/0808* (2013.01)
(58) Field of Classification Search
CPC .................................................. G07C 5/0808
See application file for complete search history.

(56) References Cited

U.S. PATENT DOCUMENTS

| | | |
|---|---|---|
| 8,909,410 B2 | 12/2014 | Weber et al. |
| 10,884,103 B2 | 1/2021 | Pliefke et al. |
| 11,127,229 B2 | 9/2021 | Thompson |
| 11,210,869 B2 | 12/2021 | Balan |
| 2019/0331481 A1* | 10/2019 | Flood ............... G01P 13/04 |

FOREIGN PATENT DOCUMENTS

| | | |
|---|---|---|
| CN | 102222023 A | 10/2011 |
| CN | 102749912 A | 10/2012 |
| CN | 103324131 A | 9/2013 |
| CN | 107015914 A | 8/2017 |
| CN | 109783144 A | 5/2019 |
| CN | 110808892 A | 2/2020 |

(Continued)

OTHER PUBLICATIONS

Liu Li, et al., The Design and Implement of the Self-help Machine Based on Components, Journal of Hunan Institute of Science and Technology (Natural Sciences), 2003, pp. 83-87, vol. 16 No. 2.

(Continued)

*Primary Examiner* — Michael V Kerrigan
(74) *Attorney, Agent, or Firm* — Bayramoglu Law Offices LLC

(57) ABSTRACT

An automatic reading and writing method of a vehicular calibration signal and a vehicle calibration system are provided. The automatic reading and writing method of a vehicular calibration signal includes: creating corresponding mapping system variables respectively for calibration signals in a calibration module; assigning an initial value to the mapping system variables; for a calibration signal defined as an observation variable, reading, by the calibration module, a value of the calibration signal in real time, and storing the value into a corresponding mapping system variable; when reading the mapping system variable, reading a last-stored value of the mapping system variable.

18 Claims, 4 Drawing Sheets

(56) References Cited

FOREIGN PATENT DOCUMENTS

| | | |
|---|---|---|
| CN | 111443327 A | 7/2020 |
| CN | 111475358 A | 7/2020 |
| CN | 111488297 A | 8/2020 |
| CN | 106850798 B | 9/2020 |
| CN | 113360280 A | 9/2021 |
| CN | 113760956 A | 12/2021 |
| CN | 114710519 A | 7/2022 |
| CN | 114787015 A | 7/2022 |
| CN | 114896168 A | 8/2022 |
| CN | 115454757 A | 12/2022 |
| CN | 116266183 A | 6/2023 |
| JP | 2012096668 A | 5/2012 |
| JP | 7296025 B1 | 6/2023 |
| RU | 160110 U1 | 3/2016 |
| RU | 2592711 C1 | 7/2016 |
| WO | 2008058473 A1 | 5/2008 |
| WO | 2017189361 A1 | 11/2017 |
| WO | 2023087271 A1 | 5/2023 |

OTHER PUBLICATIONS

Li Zheng-Xue, et al., An asynchronous non-blocking tile map server based on NodeJS, Science of Surveying and Mapping, 2015, pp. 128-132, vol. 40 No. 10.

Qu Zhijian, et al., Data engine technology of low delay asynchronous refresh for SVG wiring diagram interface of distributed power network, Power System Protection and Control, 2016, pp. 123-128, vol. 44 No. 21.

Tosun, How TSMaster uses the Tongsing calibration module, Tongsing's dbc editor—CSDN blog, 2022, pp. 1-33.

Yaping Zhang, A Major Update to TSMaster, Understanding the Signal Mapping Operation Process, 2023, pp. 1-11.

Vector, "Run-Time Measurement and Calibration of ECUs—Vector Solution Overview", 2017, pp. 1-43, retrieved from: https://cdn.vector.com/cms/content/events/2019/VA/TechNight/. (Year: 2019).

* cited by examiner

AUTOMATIC READING AND WRITING METHOD OF VEHICULAR CALIBRATION SIGNAL AND VEHICLE CALIBRATION METHOD

TECHNICAL FIELD

The present disclosure relates to the field of vehicular software development technologies and in particular to an automatic reading and writing method of a vehicular calibration signal and a vehicle calibration method.

BACKGROUND

In a vehicular calibration signal process, a reading method of a monitored signal includes: opening a calibration database; selecting a to-be-monitored signal from the calibration database; dragging the signal into or associating the signal to a monitoring window, for example, a graphic window; observing a change of the signal from the monitoring window.

A method of writing a calibration signal includes: opening a calibration database; selecting a to-be-written signal from the calibration database; dragging the signal into or associating the signal to a text window; in the text window, filling a to-be-modified value and pressing return to confirm the modification; confirming the signal value is successfully modified.

SUMMARY

The present disclosure relates to an automatic reading and writing method of a vehicular calibration signal and a vehicular calibration method. The automatic reading and writing method of a vehicular calibration signal includes:
creating corresponding mapping system variables respectively for calibration signals in a calibration module;
assigning an initial value to the mapping system variables;
for a calibration signal defined as an observation variable, reading, by the calibration module, a value of the calibration signal in real time, and storing the value into a corresponding mapping system variable;
when reading the mapping system variable, reading a last-stored value of the mapping system variable.

The contents of the present disclosure aim to provide brief descriptions for the subject described in the specification. Therefore, it should be understood that the above features are merely illustrative and shall not be interpreted as narrowing the scope or essence of the described subject of the specification in any way.

Other features, aspects and advantages of the subject described in the specification will become apparent by way of following specific embodiments, accompanying drawings and claims.

BRIEF DESCRIPTION OF THE DRAWINGS

In order to more clearly describe the technical solutions in the specific embodiments of the present disclosure or the prior arts, the drawings required for descriptions of the specific embodiments or the prior arts will be briefly introduced. Apparently, the drawings described hereunder are only some embodiments of the present disclosure. Those skilled in the art can also obtain other drawings based on these drawings without making creative work.

DETAILED DESCRIPTION OF THE EMBODIMENTS

In order to make the object, technical solutions and advantages of the embodiments of the present disclosure clearer, the technical solutions of the present disclosure will be fully and clearly described in combination with drawings. Apparently, the embodiments described herein are only some embodiments rather than all embodiments. All other embodiments obtained by those skilled in the art based on these drawings without making creative work shall fall within the scope of protection of the present disclosure.

In a vehicle calibration signal process, reading and writing a calibration signal are controlled by an application program interface (API) function or a specific monitoring program, for example, by drawing a signal monitoring curve on a graphic window, or by modifying a signal value on a text window. Thus, the calibration signal cannot be used as one variable, which results in one problem: when a user desires to draw a curve of values of a plurality of calibration signals subjected to mathematical operation or modify a target calibration signal by involving values of custom variables in operation, there is no method available for the above implementation.

Therefore, at least one embodiment provides an automatic reading and writing method of a vehicular calibration signal, which includes: creating corresponding mapping system variables respectively for calibration signals in a calibration module; assigning an initial value to the mapping system variables; for a calibration signal defined as an observation variable, reading, by the calibration module, a value of the calibration signal in real time, and storing the value into a corresponding mapping system variable; when reading the mapping system variable, reading a last-stored value of the mapping system variable.

In some embodiments, the automatic reading and writing method of a vehicular calibration signal can map any calibration signal to a mapping system variable inside the calibration module, so as to read and write the calibration signal by using the mapping system variable, thereby solving the interoperation problem of the calibration signal.

Various non-limiting implementations of the embodiments of the present disclosure will be detailed below in combination with accompanying drawings.

Figure 1:
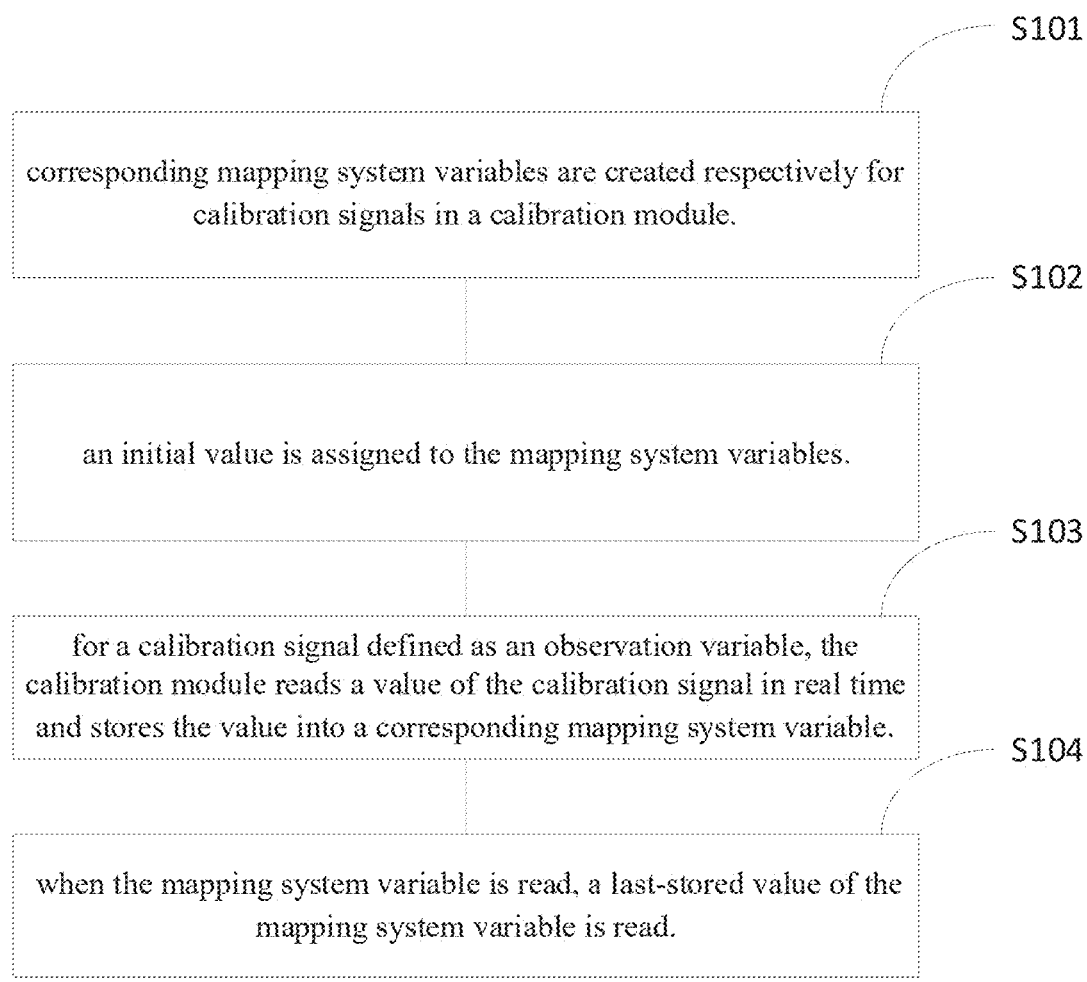
FIG. 1 is a schematic diagram illustrating steps of an automatic reading and writing method of a vehicular calibration signal according to some embodiments of the present disclosure.

As shown in FIG. 1, one or more embodiments provide an automatic reading and writing method of a vehicular calibration signal, which includes the following steps.

At step S101, corresponding mapping system variables are created respectively for calibration signals in a calibration module.

At step S102, an initial value is assigned to the mapping system variables.

At step S103, for a calibration signal defined as an observation variable, the calibration module reads a value of the calibration signal in real time and stores the value into a corresponding mapping system variable.

At step S104, when the mapping system variable is read, a last-stored value of the mapping system variable is read.

The steps shown in FIG. 1 only illustrate a flowchart of the automatic reading and writing method of the vehicular calibration signal and do not limit a specific step sequence.

In some embodiments, the automatically-created mapping system variable is named based on two rules. A software system provides options for a user to select:
(1) The name of the calibration signal is directly used. For example, if the name of the calibration signal is "abc", the name of the mapping system variable is also "abc";
(2) The name of the electronic control unit (ECU) is used as a prefix, and the name of the calibration signal and the name of the ECU are separated by an underscore. For example, if the name of the calibration signal is "abc" and the name of the ECU is "ABS", the name of the mapping system variable is "ABS_abc".

After each mapping system variable is created, the calibration module is firstly connected to the ECU to read a current value (a value at the time of successful connection with the ECU) of each calibration signal from the ECU, and assign each current value to the corresponding mapping system variable. Thus, an initial value is assigned to each mapping system variable.

Since the calibration module reads the value of the calibration signal in real time and stores the value into the corresponding mapping system variable, it is guaranteed that the value of the mapping system variable is always the latest value. If a user desires to read the latest value of the calibration signal, it is only required to read the latest value of the mapping system variable, where the latest value is the last-stored value. A time point for the last storage is a timestamp when the calibration module last reads the value of the calibration signal.

In some embodiments, the automatic reading and writing method of the vehicular calibration signal maps any calibration signal to a mapping system variable inside the calibration module, such that the read and write operation for the calibration signal is converted into the read and write operation for a local variable, which results in the following effect.

(1) In all variable association scenarios of the software system, the mapping system variable can be associated.

For example, after a mapping system variable is associated by using a drag box in a panel, the value of the calibration signal can be directly modified by mouse drag, without writing a special program to respond to the event information of the drag box.

Furthermore, for example, in a graphic program, reading and writing a mapping system variable can be converted into reading and writing a corresponding calibration signal, without calling the API function of the calibration module, thus making the program writing process simple and visual.

(2) The mapping system variable can be involved in construction of an expression, namely, a new observation variable signal expression is constructed. For example, a new observation variable signal c is constructed, which is equal to a sum of a mapping system variable a and a controller area network (CAN) signal b, which can be expressed as: c=a+b. Thus, the observation variable signal c can be observed through a graphic window. Further, a new variable is constructed, namely, a test result expression is constructed. For example, a total test result is y=x1 & x2 & x3, where x1, x2 and x3 are three test criteria. Only when the three criteria are successful can the total test result be successful. But, the traditional calibration signal control method cannot satisfy this requirement.

The reading method of a calibration signal defined as an observation variable will be detailed below in combination with examples.

It is assumed that a graphic program is used in a vehicular ECU function test to determine whether a supply voltage signal KL30 is greater than 9V.

Firstly, the calibration module loads a calibration database and automatically creates a mapping system variable named as "KL30" for the loaded supply voltage signal.

A user writes a graphic program for determining the supply voltage signal, where an expression of an execution unit corresponding to the determination is "KL30>9".

Then, the user starts test, and the calibration module is firstly connected to the ECU to read a current value of the KL30 signal from the ECU, and assigns the value to the mapping system variable "KL30", and hence, an initial value is assigned to the mapping system variable "KL30".

Then, the calibration module periodically reads the KL30 signal value by polling or data acquisition (DAQ), and stores the value into the mapping system variable "KL30".

Finally, when the execution unit for executing the graphic program of the user is "KL30>9", the value of the mapping system variable "KL30" is directly read and then compared with 9.

In the prior arts, a rewrite operation for a calibration signal of calibration variable or a calibration signal of writable observation variable is a special operation, which involves sending of complex calibration commands inside the calibration module and matching of communication protocols of upper and lower computers. It is required to fill a to-be-rewritten value in a specific calibration variable list provided by the calibration module, which leads to a lower rewrite efficiency.

In some embodiments, in various scenarios such as C program, graphic program, user-defined panel or expression (with a graphic program as an example in the following cases), the calibration signal of calibration variable or the calibration signal of writable observation variable can be easily modified by simply assigning a value to the corresponding mapping system variable, which effectively improves the rewrite for the calibration signal of calibration variable or the calibration signal of writable observation variable.

Specifically, in some embodiments, the automatic reading and writing method of the vehicular calibration signal further includes:
  for a calibration signal defined as a calibration variable, associating an assignment function to an asynchronous function, where the assignment function is a mapping system variable write function of a to-be-written target value;
  when the calibration variable is written, distributing, by the asynchronous function, a write command and a read command to the calibration module, and then returning immediately, where the call of the asynchronous function is completed.

The writing method of a calibration signal defined as a calibration variable will be detailed below in combination with examples.

It is assumed that in a vehicular ECU function test, a graphic program is used to write a value of a calibration signal EV_Current as 2.1 to control a current of the corresponding electromagnetic valve EV as 2.1 amperes.

Firstly, the calibration module loads a calibration database, and automatically creates a mapping system variable named as "EV_Current" for the loaded current signal of the electromagnetic valve.

The user writes a graphic program for writing the value of the calibration signal EV_Current as 2.1 and an expression of an execution unit corresponding to the write operation is "EV_Current=2.1".

Then, the user starts test and the calibration module is firstly connected to the ECU and associates an assignment function of the mapping system variable "EV_Current" to an asynchronous function "set_sys_var_async", where the function of the asynchronous function is to call the API function of the calibration module to execute the write and read operation for the current signal of the electromagnetic valve.

When the execution unit for executing the graphic program of the user is "EV_Current=2.1", the calibration module calls the asynchronous function "set_sys_var_async" to introduce a target value "2.1" as a parameter. In this asynchronous function, the following requests are initiated to the calibration module sequentially and asynchronously:
 (1) writing the request of the calibration signal "EV_Current", where the parameter carried by the request is a write value 2.1;
 (2) reading the request of calibration signal "EV_Current".

After the execution unit initiates the request, the execution unit does not need to wait for a request result but returns immediately from the asynchronous function "set_sys_var_async". The calibration module will write the calibration signals "EV_Current" in sequence at backstage and read the calibration signals "EV_Current".

Specifically, in some embodiments, the automatic reading and writing method of the vehicular calibration signal further includes:
 for a calibration signal defined as a writable observation variable, associating an assignment function to an asynchronous function, where the assignment function is a mapping system variable write function of a to-be-written target value;
 when the writable observation variable is written, distributing, by the asynchronous function, a write command and a read command to the calibration module, and then returning immediately, where the call of the asynchronous function is completed.

The writing method of a calibration signal defined as a writable observation variable will be detailed below in combination with examples.

It is assumed that in a vehicular engine control module (ECM) function test, a graphic program is used to write a value of the calibration signal EV_MAX_Current as 1.0 to set a maximum sampling current of the corresponding electromagnetic valve EV to 1.0 amperes.

Firstly, the calibration module loads a calibration database and automatically creates a mapping system variable named as "EV_MAX_Current" for the loaded maximum sampling current signal of the electromagnetic valve.

The user writes a graphic program for writing the value of the maximum sampling current signal of the electromagnetic valve as 1.0, where an expression of an execution unit corresponding to the operation is "EV_MAX_Current=1.0".

Then, the user starts test, and the calibration module is firstly connected to the ECU to read a current value of the signal EV_MAX_Current from the ECU, and assigns the value to the mapping system variable "EV_MAX_Current".

Then, the calibration module periodically reads the value of the signal EV_MAX_Current by polling or DAQ, and stores the value into the mapping system variable "EV_MAX_Current".

If the ECU detects the maximum sampling current of the electromagnetic valve EV is 3.0 amperes in a test process, the value of the mapping system variable "EV_MAX_Current" is rewritten as 3.0.

The calibration module also associates an assignment function of the mapping system variable "EVM_AX_Current" to an asynchronous function "set_sys_var_async", where the function of the asynchronous function is to call the API function of the calibration module to execute the write and read operation for the maximum sampling current signal of the electromagnetic valve EV.

When the execution unit for executing the graphic program of the user is "EV_MAX_Current=1.0", the calibration module may call this asynchronous function "set_sys_var_async" to introduce the target value "1.0" as a parameter. In this asynchronous function, the following requests are initiated to the calibration module sequentially and asynchronously:
 (1) writing the request of the calibration signal "EV_MAX_Current", where the parameter carried by the request is a write value 1.0;
 (2) reading the request of the calibration signal "EV_MAX_Current".

After the execution unit initiates the request, the execution unit does not need to wait for a request result but returns immediately from the asynchronous function "set_sys_var_async". The calibration module will write the calibration signals "EV_MAX_Current" in sequence at backstage and read the calibration signals "EV_MAX_Current".

In a subsequent test process, the value of the signal EV_MAX_Current in the ECU is reset to 1.0. Only when the ECU detects the maximum current of the EV valve exceeds this value can the values of the calibration signal EVM_AX_Current and the mapping system variable "EV_MAX_Current" be rewritten.

It is to be noted that, the calibration signal EV_MAX_Current refers to a maximum sampling current value of the electromagnetic valve EV sampled and calculated inside the ECU. For example, the initial value of "EV_MAX_Current" is 1.0. When the current sampling current is always 0.5 amperes, the value of "EV_MAX_Current" remains 1.0. When the current sampling current is greater than 1.0 amperes, for example, when the currently-collected current value is 1.2, the value of "EV_MAX_Current" is immediately changed into 1.2. At this time, even if the current electric current value drops to 0.2 amperes, the "EV_MAX_Current" representing a historical maximum sampling current value still remains 1.2 without any drop. Thus, the calibration signal becomes a bidirectional read and write signal, and thus the ECU can increase it based on the actual current value obtained by sampling, and the user may also reset the calibration signal to a lower value from a use end with the advantage being that the user can read the maximum value of the calibration signal in different periods of time without encountering the case that the calibration signal increases to 3.0 from the very beginning, which results in that the subsequent observation for the calibration signal enters a blind area due to no resetting measures and hence 3.0 has to be read forever. Therefore, in this case, the value of the signal EV_MAX_Current in the ECU is reset to 1.0 and the values of the calibration signal EV_MAX_Current and the mapping system variable "EV_MAX_Current" can be rewritten only when the ECU detects the maximum current of the EV valve exceeds this value.

In some embodiments, when the calibration module executes the write command and the read command successfully at the same time, the last-stored value of the mapping system variable is refreshed into the to-be-written target value.

In some embodiments, the calibration signal of observation variable refers to a calibration signal purely for observation, for example, an engine rotation signal and a vehicle speed signal and the like. These signals are determined based on measurement for relevant information of the physical world and can reflect objective facts needing no modification.

In some embodiments, the calibration signal of calibration variable refers to a parameter to be set, for example, P, I and D parameters in a packet identifier (PID) algorithm, which can determine a running status of the algorithm after modification.

In some embodiments, the calibration signal of writable observation variable refers to a signal used for observation or interfering with an observation value. For example, these signals such as the maximum current value of the electromagnetic valve may continuously increase to a maximum value along with observation. For example, if a maximum value within two hours from a current moment is to be observed, the observation value is reset and read within two hours.

In some embodiments, when the calibration module causes a calibration signal to be invalid for not being enabled, if a to-be-written target value is written into the mapping system variable corresponding to the invalid calibration signal, the calibration module will report an error.

The case of writing a calibration signal when the calibration module is not enabled is detailed below in combination with examples.

It is assumed that in a vehicular ECU function test, a graphic program is used to write the value of the calibration signal EV_Current as 2.1 to control the current of the corresponding electromagnetic valve EV to be 2.1 amperes.

Firstly, the calibration module loads a calibration database and automatically creates a mapping system variable named as "EV_Current" for the loaded current signal of the electromagnetic valve.

The user writes a graphic program for writing the value of the calibration signal EV_Current as 2.1, where an expression of an execution unit corresponding to the write operation is "EV_Current=2.1".

Then, the user starts test and the calibration module is firstly connected to the ECU but finally fails, and hence, the calibration module records the mapping system variable "EV_Current" as invalid.

When the execution unit for executing the graphic program of the user is "EV_Current=2.1", the calibration module detects that the mapping system variable is recorded as invalid, abandons execution of assignment operation, and prints out error information "invalid mapping system variable: EV_Current" in a calibration module message.

Figure 2:
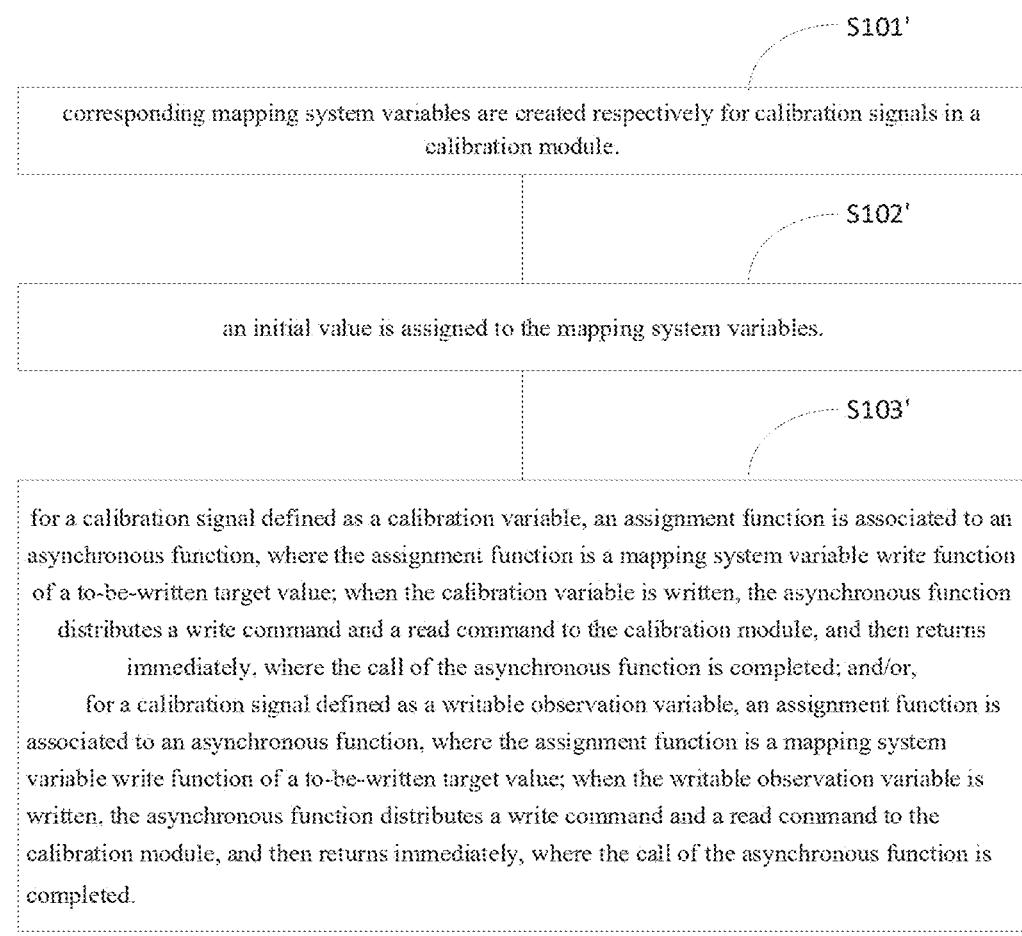
FIG. 2 is a schematic diagram illustrating steps of an automatic reading and writing method of a vehicular calibration signal according to some embodiments of the present disclosure.

As shown in FIG. 2, one or more embodiments further provide an automatic reading and writing method of a vehicular calibration signal, which includes the following steps.

At step S101', corresponding mapping system variables are created respectively for calibration signals in a calibration module.

At step S102', an initial value is assigned to the mapping system variables.

At step S103', for a calibration signal defined as a calibration variable, an assignment function is associated to an asynchronous function, where the assignment function is a mapping system variable write function of a to-be-written target value; when the calibration variable is written, the asynchronous function distributes a write command and a read command to the calibration module, and then returns immediately, where the call of the asynchronous function is completed; and/or, for a calibration signal defined as a writable observation variable, an assignment function is associated to an asynchronous function, where the assignment function is a mapping system variable write function of a to-be-written target value; when the writable observation variable is written, the asynchronous function distributes a write command and a read command to the calibration module, and then returns immediately, where the call of the asynchronous function is completed.

The steps in FIG. 2 are only a flowchart of an automatic reading and writing method of a vehicular calibration signal and do not limit the specific step sequence.

Specifically, the reading and writing method of the calibration signal defined as a calibration variable can be referred to the above specific descriptions of the reading and writing method of the calibration signal defined as a calibration variable and will not be described again.

Specifically, the reading and writing method of the calibration signal defined as a writable observation variable can be referred to the above specific descriptions of the reading and writing method of the calibration signal defined as a writable observation variable and will not be described again.

One or more embodiments further provide a vehicle calibration method, which includes: reading a calibration signal from an ECU; performing the automatic reading and writing method of a vehicular calibration signal as mentioned above; and distributing to the ECU a write value generated after performing the automatic reading and writing method of a vehicular calibration signal. Specifically, a calibration signal is read from an ECU through a bus adapter; a computer device is communicably connected to the bus adapter, performs the automatic reading and writing method of a vehicular calibration signal, and distributes a write value generated after performing the automatic reading and writing method of a vehicular calibration signal to the ECU through the bus adapter.

The automatic reading and writing method of a vehicular calibration signal can be achieved by referring to the specific descriptions of the above two reading and writing methods of a calibration signal and will not be repeated herein.

Figure 3:
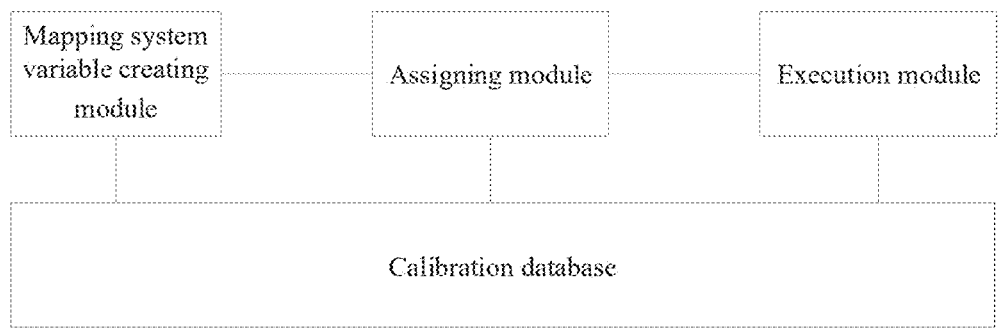
FIG. 3 is a principle bock diagram illustrating a vehicle calibration system according to some embodiments of the present disclosure.

As shown in FIG. 3, one or more embodiments further provide a vehicle calibration system, which includes a computer device, where the computer device is configured to include:

a mapping system variable creating module, configured to create corresponding mapping system variables respectively for calibration signals;

an assigning module, configured to assign an initial value to the mapping system variables;

a calibration database, configured to store calibration signal data and define the calibration signals as an observation variable or a calibration variable or a writable observation variable;

an execution module, configured to write the corresponding calibration signal and/or read the mapping system variable.

Figure 4:
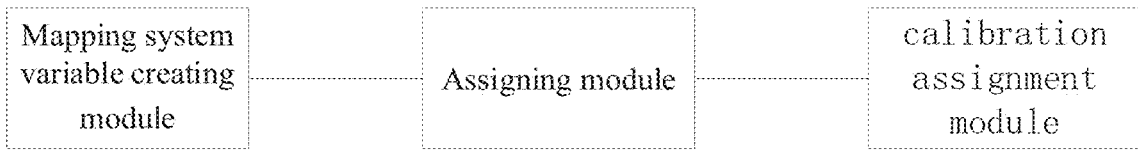
FIG. 4 is a principle bock diagram illustrating a vehicle calibration system according to some embodiments of the present disclosure.

As shown in FIG. 4, one or more embodiments further provide a vehicle calibration system, including: a computer device which is configured to include:

a mapping system variable creating module, configured to create corresponding mapping system variables respectively for calibration signals;

an assigning module, configured to assign an initial value to the mapping system variables;

a calibration assigning module, configured to for a calibration signal defined as a calibration variable, associating an assignment function to an asynchronous function, wherein the assignment function is a mapping system variable write function of a to-be-written target value; when the calibration variable is written, distributing, by the asynchronous function, a write command and a read command to the calibration module, and then returning immediately, wherein the call of the asynchronous function is completed; and/or for a calibration signal defined as a writable observation variable, associating an assignment function to an asynchronous function, wherein the assignment function is a mapping system variable write function of a to-be-written target value; when the writable observation variable is written, distributing, by the asynchronous function, a write command and a read command to the calibration module, and then returning immediately, wherein the call of the asynchronous function is completed.

In some embodiments, the functions of the mapping system variable creating module, the assigning module, the calibration database and the execution module can be achieved in the computer device or by a processor module.

It is to be noted that the type of the calibration signals is determined by the ECU in which the calibration signal of observation variable for observation, the calibration signal of writable calibration variable and the calibration signal of writable observation variable are provided. These calibration signals are automatically generated into a database file called A2L before being introduced into the ECU. The software system loads the A2L database file to know the types of the calibration signals in the ECU.

In one of the application embodiments, for a calibration signal defined as an observation variable, the execution module reads the value of the calibration signal in real time and stores the value into the corresponding mapping system variable;

when the mapping system variable is read, a last-stored value of the mapping system variable is read.

Specifically, the reading method of the calibration signal defined as an observation variable can be referred to the above specific descriptions of the reading method of calibration signal defined as an observation variable and will not be repeated herein.

In another application embodiment, for a calibration signal defined as a calibration variable, an assignment function is associated to an asynchronous function, where the assignment function is a mapping system variable write function of a to-be-written target value;

when the calibration variable is written, the asynchronous function distributes a write command and a read command to the execution module, and then returns immediately, where the call of the asynchronous function is completed.

Specifically, the reading and writing method of the calibration signal defined as a calibration variable can be referred to the above specific descriptions of the reading and writing method of calibration signal defined as a calibration variable and will not be repeated herein.

In a third application embodiment, for a calibration signal defined as a writable observation variable, an assignment function is associated to an asynchronous function, where the assignment function is a mapping system variable write function of a to-be-written target value;

when the writable observation variable is written, the asynchronous function distributes a write command and a read command to the execution module, and then returns immediately, where the call of the asynchronous function is completed.

Specifically, the reading and writing method of the calibration signal defined as a writable observation variable can be referred to the above specific descriptions of the reading and writing method of the calibration signal defined as a writable observation variable and will not be repeated herein.

An electronic device in some embodiments will be described below from the angle of hardware processing, but not limited for its specific implementation.

Figure 5:
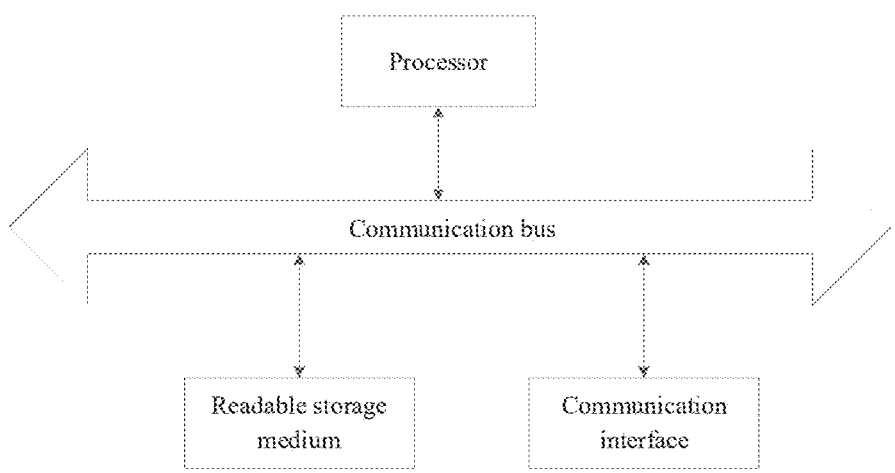
FIG. 5 is a principle block diagram illustrating an electronic device according to some embodiments of the present disclosure.

As shown in FIG. 5, the electronic device includes a processor, a readable storage medium, a communication bus and a communication interface, where the processor, the readable storage medium, and the communication interface communicate with each other via the communication bus; the readable storage medium stores programs of performing the automatic reading and writing method of a vehicular calibration signal, and the processor is configured to execute the programs of performing the automatic reading and writing method of a vehicular calibration signal.

In other embodiments, a computer device, and an industrial personal computer may be one of the electronic devices.

The structure in FIG. 5 does not limit the electronic device and may include more or less components than shown in the drawings or combine some components or have different components deployed.

In some embodiments, the communication interface may be RS232, RS485, USB interface or TYPE interface or the like, which may be connected with an external bus adapter. The communication interface may also include wired or wireless network interface. The network interface may optionally include wired interface and/or wireless interface (such as wireless fidelity (WI-FI) interface, Bluetooth interface and the like), which is usually used to establish communication connection between the computer device and other electronic devices.

The readable storage medium or the computer readable storage medium includes at least one type of memories. The memory includes flash memory, hard disk drive, multimedia card, card type memory (e.g. secure digital (SD) memory or memory data register (DX) or the like), magnetic memory, magnetic disk or compact disk or the like. In some embodiments, the memory may be an internal storage unit in the computer device, for example, a hard disk drive of the computer device. In some other embodiments, the memory may also be an external storage device of the computer device, for example, a plug type hard disk drive, a smart media card (SMC), a secure digital (SD) card, a flash card or the like on the computer device. Furthermore, the memory may include both the internal storage unit and the external storage device in the computer device. The memory may be used to not only store an application software installed on the computer device and various types of data, for example, the codes of the computer programs and the like but also temporarily store data already output or to be output.

In some embodiments, the processor may be a central processing unit (CPU), a controller, a microcontroller, a microprocessor or another data processing chip, which is used to run the program codes in the memory or process the data, for example, execute the computer programs or the like.

In some embodiments, the communication bus may also be an input/output bus, which may be a Peripheral Component Interconnect (PCI) bus, or an Enhanced Industry Standard Architecture (EISA) bus or the like. The bus may include an address bus, a data bus and a control bus and the like.

Optionally, the computer device may also include a user interface, which may include a display, and an input unit, for example, a keyboard. Optionally, the user interface may also include a standard wired interface and wireless interface. Optionally, in some embodiments, the display may be an LED display, a liquid crystal display, a touch liquid crystal display and an Organic Light-Emitting Diode (OLED) touch display and the like. The display may also be appropriately referred to as display screen or display unit for displaying information processed in the computer device as well as a visual user interface.

When executing the above programs, the processor performs the steps in the embodiment of the automatic reading and writing method of a vehicular calibration signal as shown in FIG. 1, for example, the steps S101 to S104 shown in FIG. 1. Alternatively, the processor executes the computer programs to realize the functions of the modules or units in each apparatus embodiment.

In some embodiments, the processor is specifically configured to perform the steps of:
  creating corresponding mapping system variables respectively for calibration signals in a calibration module;
  assigning an initial value to the mapping system variables;
  for a calibration signal defined as an observation variable, reading, by the calibration module, a value of the calibration signal in real time, and storing the value into a corresponding mapping system variable;
  when reading the mapping system variable, reading a last-stored value of the mapping system variable.

Optionally, as one possible implementation, the processor is further configured to perform the steps of
  for a calibration signal defined as a calibration variable, associating an assignment function to an asynchronous function, where the assignment function is a mapping system variable write function of a to-be-written target value;
  when the calibration variable is written, distributing, by the asynchronous function, a write command and a read command to the calibration module, and then returning immediately, where the call of the asynchronous function is completed.

Optionally, as one possible implementation, the processor is further configured to perform the steps of
  for a calibration signal defined as a writable observation variable, associating an assignment function to an asynchronous function, wherein the assignment function is a mapping system variable write function of a to-be-written target value;
  when the writable observation variable is written, distributing, by the asynchronous function, a write command and a read command to the calibration module, and then returning immediately, where the call of the asynchronous function is completed.

Optionally, as one possible implementation, the processor is further configured to perform the steps of
  when the calibration module executes the write command and the read command successfully at the same time, refreshing the last-stored value of the mapping system variable into the to-be-written target value.

Optionally, as one possible implementation, the processor is further configured to perform the steps of:
  In a case that the calibration module causes the calibration signal to be invalid for not being enabled, when a to-be-written target value is written into the mapping system variable corresponding to the invalid calibration signal, reporting, by the calibration module, an error.

One or more embodiments further provide a computer readable storage medium storing programs of an automatic reading and writing method of a vehicular calibration signal. The programs are executed by a processor to perform the steps of the automatic reading and writing method of a vehicular calibration signal, which can be referred to the specific descriptions of the automatic reading and writing method of a vehicular calibration signal and will not be repeated herein.

Figure 6:
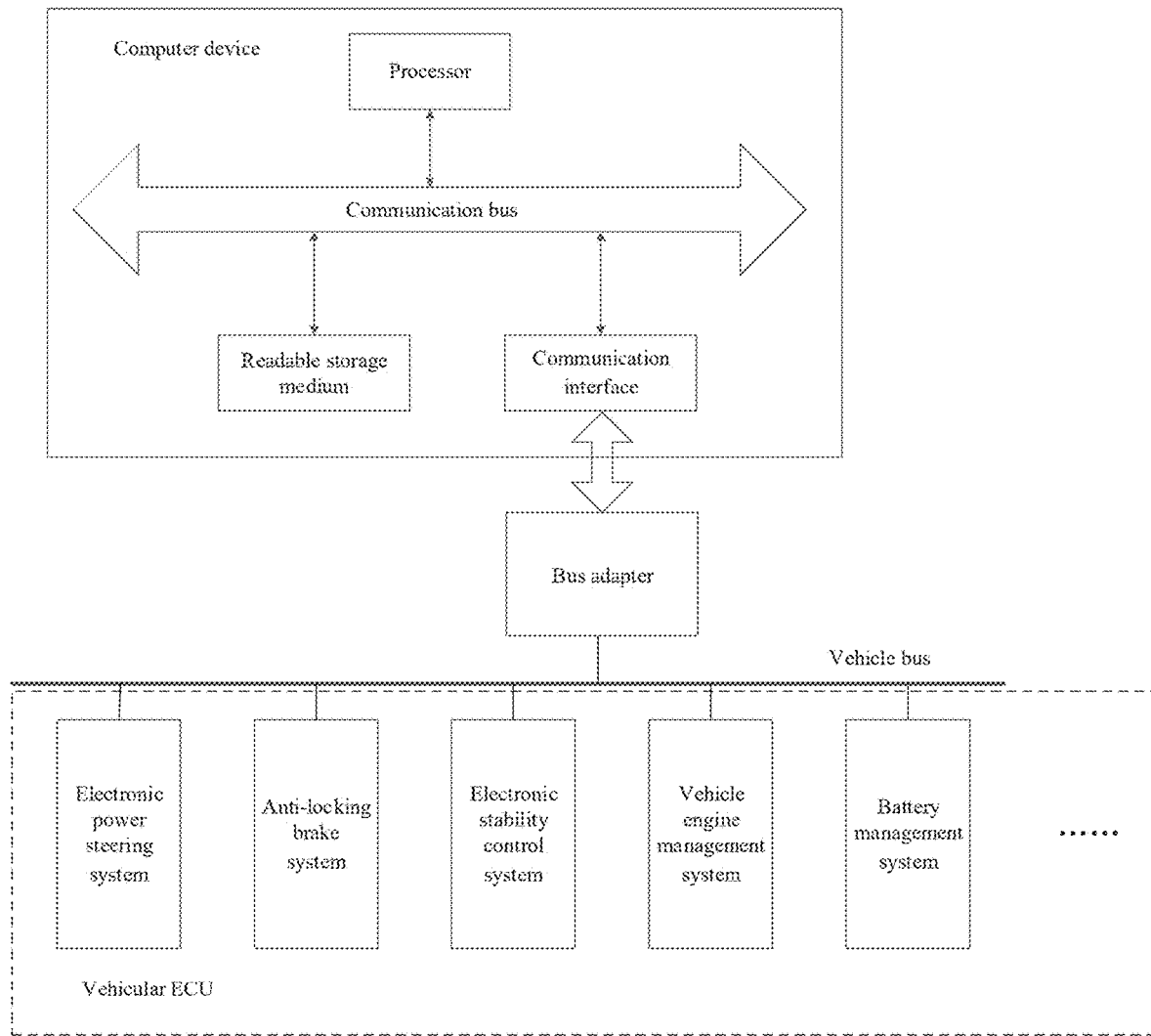
FIG. 6 is a principle block diagram illustrating a vehicular development and debugging system according to some embodiments of the present disclosure.

As shown in FIG. 6, some embodiments further provide a vehicular development and debugging system, including: a computer device and a bus adapter, where the computer device includes: a processor, a readable storage medium, a communication bus, and a communication interface; where the readable storage medium is configured to store programs of performing the automatic reading and writing method of the vehicular calibration signal and the processor is configured to execute the programs of performing the automatic reading and writing method of the vehicular calibration signal; the processor, the readable storage medium, the communication interface communicate with the bus adapter via the communication bus; the bus adapter is configured to read a calibration signal from an ECU, and further to distribute to the ECU a write value generated after the processor performs the automatic reading and writing method of the vehicular calibration signal.

In some embodiments, the automatic reading and writing method of the calibration signal includes:
  Creating corresponding mapping system variables respectively for calibration signals in a calibration module;
  assigning an initial value to the mapping system variables;
  for the calibration signal defined as an observation variable, reading, by the calibration module, a value of the calibration signal in real time, and storing the value into a corresponding mapping system variable;
  when reading the mapping system variable, reading a last-stored value of the mapping system variable.

In some embodiments, the automatic reading and writing method of the vehicular calibration signal includes:
  creating corresponding mapping system variables respectively for calibration signals in a calibration module;
  assigning an initial value to the mapping system variables;
  for a calibration signal defined as a calibration variable, associating an assignment function to an asynchronous function, wherein the assignment function is a mapping system variable write function of a to-be-written target value; when the calibration variable is written, distributing, by the asynchronous function, a write command and a read command to the calibration module, and then returning immediately, wherein the call of the asynchronous function is completed; and/or, for a calibration signal defined as a writable observation variable, associating an assignment function to an asynchronous function, wherein the assignment function is a mapping system variable write function of a to-be-written target value; when the writable observation variable is written, distributing, by the asynchronous function, a write command and a read command to the calibration module, and then returning immediately, wherein the call of the asynchronous function is completed.

In some embodiments, the computer device corresponds to the above electronic device and will not be repeated herein.

In some embodiments, for a calibration signal defined as a calibration variable, an assignment function is associated to an asynchronous function, where the assignment function is a mapping system variable write function of a to-be-written target value; when the calibration variable is written, the asynchronous function distributes a write command and a read command to the calibration module, and then returns immediately, where the call of the asynchronous function is completed.

In some embodiments, for a calibration signal defined as a writable observation variable, an assignment function is associated to an asynchronous function, where the assignment function is a mapping system variable write function of a to-be-written target value; when the writable observation variable is written, the asynchronous function distributes a write command and a read command to the calibration module, and then returns immediately, where the call of the asynchronous function is completed.

In some embodiments, the bus adapter may be a CAN bus adapter, a controller area network flexible data rate (CANFD) bus adapter, a FastLIN bus adapter, a local interconnect network (LIN) bus adapter, an Ethernet bus adapter, a FlexRay bus adapter or may be one to multiple or multiple to multiple, which is not limited for the specific implementation in the present embodiment. In some embodiments, the written value may be distributed by communicating with the ECU based on unified diagnostic services (UDS), universal calibration protocol (XCP) or CAN calibration Protocol (CCP) protocol.

In some embodiments, the ECU includes an electronic power steering system, an anti-locking brake system, an electronic stability control system, a vehicle engine management system, and a battery management system.

In some embodiments, in the vehicular development and debugging system, the computer readable storage medium, the processor and the electronic device, the automatic reading and writing method of a vehicular calibration signal can be the same as the two automatic reading and writing methods of a vehicular calibration signal and thus will not be repeated herein.

In some embodiments, a computer readable storage medium, storing computer readable instructions, wherein the computer readable instructions are executed by at least one processor to perform the method:
creating mapping system variables respectively for calibration signals in a calibration module;
assigning an initial value to the mapping system variables;
for a calibration signal defined as an observation variable, reading, by the calibration module, a value of the calibration signal in real time, and storing the value into a corresponding mapping system variable;
when reading the mapping system variable, reading a last-stored value of the mapping system variable.

In some embodiments, a computer program product, including a computer readable storage medium on which computer readable program codes are stored, wherein the computer readable program codes include instructions, which cause at least one processor (one or more computer devices) to perform the following operations:
creating mapping system variables respectively for calibration signals in a calibration module;
assigning an initial value to the mapping system variables;
for a calibration signal defined as an observation variable, reading, by the calibration module, a value of the calibration signal in real time, and storing the value into a corresponding mapping system variable;
when reading the mapping system variable, reading a last-stored value of the mapping system variable.

In some embodiments, a computer readable storage medium, storing computer readable instructions, wherein the computer readable instructions are executed by at least one processor to perform the method:
creating mapping system variables respectively for calibration signals in a calibration module;
assigning an initial value to the mapping system variables;
for a calibration signal defined as a calibration variable, associating an assignment function to an asynchronous function, wherein the assignment function is a mapping system variable write function of a to-be-written target value; when the calibration variable is written, distributing, by the asynchronous function, a write command and a read command to the calibration module, and returning immediately, wherein a call of the asynchronous function is completed; and/or,
for a calibration signal defined as a writable observation variable, associating an assignment function to an asynchronous function, wherein the assignment function is a mapping system variable write function of a to-be-written target value; when the writable observation variable is written, distributing, by the asynchronous function, a write command and a read command to the calibration module, and returning immediately, wherein a call of the asynchronous function is completed.

In some embodiments, a computer program product, including a computer readable storage medium on which computer readable program codes are stored, wherein the computer readable program codes include instructions, which cause at least one processor (one or more computer devices) to perform the following operations:
creating mapping system variables respectively for calibration signals in a calibration module;
assigning an initial value to the mapping system variables;
for a calibration signal defined as a calibration variable, associating an assignment function to an asynchronous function, wherein the assignment function is a mapping system variable write function of a to-be-written target value; when the calibration variable is written, distributing, by the asynchronous function, a write command and a read command to the calibration module, and returning immediately, wherein a call of the asynchronous function is completed; and/or,
for a calibration signal defined as a writable observation variable, associating an assignment function to an asynchronous function, wherein the assignment function is a mapping system variable write function of a to-be-written target value; when the writable observation variable is written, distributing, by the asynchronous function, a write command and a read command to the calibration module, and returning immediately, wherein a call of the asynchronous function is completed.

In the several embodiments provided by the present disclosure, it should be understood that the disclosed device and method can be implemented another way. The above device embodiments are merely illustrative, for example, the flowcharts or block diagrams in the drawings show possible system architectures, functions and operations of the device, method, and computer program product in the several embodiments provided by the present disclosure. Thus, each block in the flowcharts or block diagrams may represent one module, one program fragment or one part of codes. The module, the program fragment or the part of codes includes one or more executable instructions for implementing the specified logic functions. It should be noted that in some alternative embodiments, the functions indicated in the blocks may also be performed in a sequence different from that indicated in the drawings. For example, two continuous blocks can be actually performed basically in parallel, and sometimes may be performed in a reverse sequence, which is dependent on the functions involved. It is further noted that each block in the block diagrams and/or flowcharts and the combinations of the blocks in the block diagrams and/or flowcharts may be implemented by a dedicated hardware-based system for executing specified functions or actions, or by combination of dedicated hardware and computer instructions.

Furthermore, the functional modules in the embodiments of the present disclosure can be integrated into one independent part, or exist as separate modules or two or more of the modules are integrated into one independent part.

The functions, when implemented by software function modules and sold or used as separate products, can be stored in one computer readable storage medium. Based on such understanding, the essence of technical solutions of the present disclosure, or a part contributing to the prior arts or a part of the technical solutions can be embodied in the form of software product. The computer software product is stored in one storage medium which includes several instructions to enable one computer device (for example, a personal computer, a server, or a network device or the like) to perform all or part of the steps of the method of each of the embodiments of the present disclosure.

Enlightened by the ideal embodiments of the present disclosure, relevant workers can, based on the contents of the specification, make various changes and modifications within the scope of protection of the technical idea of the present disclosure. The technical scope of the present disclosure is not limited to the contents of the specification but to the technical scope claimed by the claims.

One or more embodiments of the present disclosure provide a computer program product, including a computer program or instruction, where the computer program or instruction is executed on a computer to cause the computer to perform any one of the above automatic reading and writing methods of a vehicular calibration signal.

What is claimed is:

1. An automatic reading and writing method of a vehicular calibration signal, comprising:
   creating mapping system variables respectively for calibration signals in a calibration module;
   assigning an initial value to the mapping system variables;
   for a calibration signal defined as an observation variable, reading, by the calibration module, a value of the calibration signal in real time, and storing the value into a corresponding mapping system variable;
   when reading the mapping system variable, reading a last-stored value of the mapping system variable.

2. The automatic reading and writing method according to claim 1, further comprising:
   for a calibration signal defined as a calibration variable, associating an assignment function to an asynchronous function, wherein the assignment function is a mapping system variable write function of a to-be-written target value;
   when the calibration variable is written, distributing, by the asynchronous function, a write command and a read command to the calibration module, and returning immediately, wherein a call of the asynchronous function is completed.

3. The automatic reading and writing method according to claim 2, wherein,
   when the calibration module executes the write command and the read command successfully at the same time, the last-stored value of the mapping system variable is refreshed into the to-be-written target value.

4. The automatic reading and writing method according to claim 1, further comprising:
   for a calibration signal defined as a writable observation variable, associating an assignment function to an asynchronous function, wherein the assignment function is a mapping system variable write function of a to-be-written target value;
   when the writable observation variable is written, distributing, by the asynchronous function, a write command and a read command to the calibration module, and returning immediately, wherein a call of the asynchronous function is completed.

5. The automatic reading and writing method according to claim 1, wherein,
   when the calibration module executes a write command and a read command successfully at the same time, the last-stored value of the mapping system variable is refreshed into a to-be-written target value.

6. The automatic reading and writing method according to claim 4, wherein,
   in a case that the calibration module causes the calibration signal to be invalid for not being enabled, when the to-be-written target value is written into a mapping system variable corresponding to the invalid calibration signal, the calibration module reports an error.

7. The automatic reading and writing method according to claim 6, wherein,
   the mapping system variable is involved in an expression construction, namely, an observation variable signal expression or a test result expression is constructed.

8. A vehicle calibration method, comprising:
   reading, by a bus adapter, a calibration signal from an electronic control unit (ECU);
   connecting, by a computer device, communicably with the bus adapter, performing the automatic reading and writing method according to claim 1, and distributing a write value generated after performing the automatic reading and writing method to the ECU through the bus adapter.

9. A computer readable storage medium, storing computer readable instructions, wherein the computer readable instructions are executed by at least one processor to perform the method according to claim 1.

10. An electronic device, comprising: a processor, a readable storage medium, a communication bus, and a communication interface, wherein the processor, the readable storage medium and the communication interface communicate with each other via the communication bus;

the readable storage medium is configured to store programs of performing the automatic reading and writing method according to claim 1, and the processor is configured to execute the programs of performing the automatic reading and writing method according to claim 1.

11. An automatic reading and writing method of a vehicular calibration signal, comprising:

creating mapping system variables respectively for calibration signals in a calibration module;

assigning an initial value to the mapping system variables;

for a calibration signal defined as a calibration variable, associating an assignment function to an asynchronous function, wherein the assignment function is a mapping system variable write function of a to-be-written target value; when the calibration variable is written, distributing, by the asynchronous function, a write command and a read command to the calibration module, and returning immediately, wherein a call of the asynchronous function is completed; and/or, for a calibration signal defined as a writable observation variable, associating an assignment function to an asynchronous function, wherein the assignment function is a mapping system variable write function of a to-be-written target value; when the writable observation variable is written, distributing, by the asynchronous function, a write command and a read command to the calibration module, and returning immediately, wherein a call of the asynchronous function is completed.

12. The automatic reading and writing method according to claim 11, wherein, when the calibration module executes the write command and the read command successfully at the same time, a last-stored value of the mapping system variable is refreshed into the to-be-written target value.

13. The automatic reading and writing method according to claim 11, further comprising:

for the calibration signal defined as the writable observation variable, associating the assignment function to the asynchronous function, wherein the assignment function is the mapping system variable write function of the to-be-written target value;

when the writable observation variable is written, distributing, by the asynchronous function, the write command and the read command to the calibration module, and returning immediately, wherein the call of the asynchronous function is completed.

14. The automatic reading and writing method according to claim 11, wherein, when the calibration module executes the write command and the read command successfully at the same time, a last-stored value of the mapping system variable is refreshed into the to-be-written target value; and, in a case that the calibration module causes the calibration signal to be invalid for not being enabled, when the to-be-written target value is written into a mapping system variable corresponding to the invalid calibration signal, the calibration module reports an error.

15. The automatic reading and writing method according to claim 14, wherein the mapping system variable is involved in an expression construction, namely, an observation variable signal expression or a test result expression is constructed.

16. A vehicle calibration method, comprising:

reading, by a bus adapter, a calibration signal from an ECU;

connecting, by a computer device, communicably with the bus adapter, performing the automatic reading and writing method according to claim 11, and distributing a write value generated after performing the automatic reading and writing method to the ECU through the bus adapter.

17. A computer readable storage medium, storing computer readable instructions, wherein the computer readable instructions are executed by at least one processor to perform the method according to claim 11.

18. An electronic device, comprising: a processor, a readable storage medium, a communication bus, and a communication interface, wherein the processor, the readable storage medium and the communication interface communicate with each other via the communication bus;

the readable storage medium is configured to store programs of performing the automatic reading and writing method according to claim 11, and the processor is configured to execute the programs of performing the automatic reading and writing method according to claim 11.

* * * * *